United States Patent
Kreuzer et al.

(10) Patent No.: US 6,761,086 B2
(45) Date of Patent: *Jul. 13, 2004

(54) STEERING WHEEL WITH DECORATIVE ELEMENT

(75) Inventors: Martin Kreuzer, Kleinwallstadt (DE); Michael Lehmann, Aschaffenburg (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/455,570

(22) Filed: Jun. 5, 2003

(65) Prior Publication Data

US 2003/0192397 A1 Oct. 16, 2003

Related U.S. Application Data

(62) Division of application No. 09/924,211, filed on Aug. 8, 2001, now Pat. No. 6,637,289.

(30) Foreign Application Priority Data

Aug. 9, 2000 (DE) ..................... 200 13 706 U

(51) Int. Cl.⁷ ................................ G05G 1/10
(52) U.S. Cl. ......................... 74/552; 74/558
(58) Field of Search ....................... 74/552, 558, 558.5, 74/557; 280/750; 219/204, 476

(56) References Cited

U.S. PATENT DOCUMENTS

| | | |
|---|---|---|
| 2,623,405 A | 12/1952 | Sampson |
| 4,581,954 A | 4/1986 | Uchida |
| 6,418,814 B1 | 7/2002 | Emeneth et al. |
| 6,441,344 B1 * | 8/2002 | Bonn et al. .................. 219/204 |
| 6,494,114 B1 * | 12/2002 | Schuler ........................ 74/558 |
| 6,499,377 B1 * | 12/2002 | Schuler ........................ 74/558 |
| 6,622,591 B2 * | 9/2003 | Albayrak et al. .............. 74/552 |
| 6,637,289 B2 * | 10/2003 | Kreuzer et al. ............... 74/552 |
| 2001/0027698 A1 | 10/2001 | Fleckenstein |
| 2001/0054327 A1 | 12/2001 | Ishii et al. |
| 2002/0008907 A1 | 1/2002 | Hobby |
| 2002/0026850 A1 | 3/2002 | Albayrak et al. |
| 2002/0029650 A1 | 3/2002 | Emeneth et al. |
| 2002/0040617 A1 | 4/2002 | Albayrak et al. |

FOREIGN PATENT DOCUMENTS

| | | |
|---|---|---|
| DE | 29803133 U1 | 5/1998 |
| DE | 20009877 U1 | 9/2000 |
| WO | WO00/05123 | 2/2000 |

OTHER PUBLICATIONS

Co–pending U.S. patent application Ser. No. 09/598,138, filed Jun. 21, 2000 entitled "Vehicle Steering Wheel".

* cited by examiner

*Primary Examiner*—Vinh T. Luong
(74) *Attorney, Agent, or Firm*—Tarolli, Sundheim, Covell & Tummino L.L.P.

(57) ABSTRACT

A steering wheel includes a steering wheel rim, a hub and at least one spoke connecting the steering wheel rim and the hub. At least one of the steering wheel rim and the spoke includes a skeleton, a sheathing surrounding the skeleton as well as a shell arranged around the sheathing, and at least one decorative element. At least one latching element is provided by which the decorative element is directly attached to the shell.

5 Claims, 2 Drawing Sheets

STEERING WHEEL WITH DECORATIVE ELEMENT

This U.S. patent application is a divisional of U.S. patent application Ser. No. 09/924,211 filed Aug. 8, 2001, now U.S. Pat. No. 6,637,289 B2 issued Oct. 28, 2003.

TECHNICAL FIELD

This invention relates to a steering wheel

BACKGROUND OF THE INVENTION

To impart steering wheels a high-quality appearance, it is known to provide the steering wheel rim with decorative elements having special surfaces, e.g. wood, aluminum or carbon fiber. Such decorative elements are often combined with a leather coating of the steering wheel rim.

A steering wheel with such decorative elements is described for instance in DE 298 03 133 U1. Seen in cross-section, the decorative element used there extends across an angle of about 90° in peripheral direction of the steering wheel rim. Via a latching connection it is connected with a component anchored in the sheathing of the steering wheel skeleton. This construction requires a complex injection coating tool for making the sheathing.

Furthermore, it is known to surround a steering wheel skeleton with a sheathing and in turn provide this sheathing with an externally fabricated shell.

BRIEF SUMMARY OF THE INVENTION

It is the object of the present invention to provide a steering wheel with decorative elements in a simple, inexpensive and flexible way.

This object is solved in a steering wheel which comprises a steering wheel rim, a hub and at least one spoke connecting the steering wheel rim and the hub. At least one of the steering wheel rim and the spoke comprises a skeleton, a sheathing surrounding the skeleton as well as a shell arranged around the sheathing, and at least one decorative element. At least one latching element is provided by means of which the decorative element is directly attached to the shell. Since the decorative element is attached to the shell and is not fixed in the sheathing, the injection molding tool for the sheathing can be designed much simpler than in accordance with the cited prior art. The latching connection with the shell also offers the advantage that the decorative element can be produced in a less expensive way and with a relatively small inherent stability, as feel and strength of the steering wheel rim or the spoke are determined by the shell. The use of a shell surrounding the sheathing of the skeleton provides for a modular construction of the steering wheel and thus facilitates changes in the design, as there must only be changed the tool for the shell, which can be produced independently of the rest of the steering wheel, in order to achieve a variation in the number, size or arrangement of the decorative elements. A latching connection provides a fast and safe method for fastening the decorative element. Since the decorative element need not perform the function of the shell at the point where it is seated, a relatively small inherent weight is sufficient. A latching connection therefore is sufficient for the occurring loads, also for vibrations.

In the shell, preferably one opening or, in more general terms, one cut-out is provided, into which protrudes the latching element for latching the decorative element with the shell. Manufacturing an opening or cut-out in the shell represents no problem in terms of injection molding technology. Openings with a small cross-section are sufficient for fastening a decorative element.

In an advantageous embodiment of the invention, the latching element protrudes through the opening and engages behind the shell. This is a simple, inexpensive and stable method of fastening the decorative element. A further advantage consists in that the latching element of the decorative element can be designed so as to be very simple.

Preferably, the sheathing has a recess, into which the latching element extends. To facilitate engaging behind the shell, a recess should favorably be provided at the corresponding point in the sheathing. In terms of manufacturing technology, this can be achieved by a simple modification of the tool.

Advantageously, the shell completely surrounds the skeleton in peripheral direction seen in a cross-section of the steering wheel rim and the spoke, respectively. Thus, both the desired diameter of the steering wheel rim or of the spoke and the general feel can be predetermined by the diameter and material of the shell. Further, the decorative element radially adjoins the shell (seen in a cross-section of the steering wheel rim and the spoke, respectively) so that the decorative element defines a second, outer shell. This design leads to an improved fix position of the decorative element.

Preferably, the shell consists of an upper shell and a lower shell, the shells having edges at which they are connected with each other. This provides for an increase in flexibility of the modular construction of the steering wheel, as for instance the lower shell can remain the same for all types of steering wheel, whereas the upper shell is adapted to the respective design. This is true above all when upper shell and lower shell are connected with each other by a latching connection. In this way, a modular construction of the steering wheel is obtained, in which different shell elements and decorative elements need only be plugged onto a base body consisting of the skeleton and the sheathing. Thus, the arrangement, number and size of the decorative elements can be designed very flexibly.

Favorably, the decorative element is directly supported on the shell on the outer side thereof, as in this case the decorative element itself must have no very high inherent stability, because it is supported by the shell. This renders the manufacture of the decorative element less expensive.

In one embodiment of the invention, there is provided a leather coating which has edges and surrounds the shell, and it is provided that the edges of the leather coating are at least partly clamped between the decorative element and the shell. In the region of the decorative element it is therefore not necessary to fix the leather coating by sewing or bonding, as it can be attached by clamping via the decorative element.

Preferably, the latching element is integrally molded on the decorative element, which provides for an inexpensive manufacture. However, the decorative element can also consist of a carrier, at which the latching element is molded, and of a decorative surface, e.g. of wood veneer, imitated wood, aluminum or some other material. For metal surfaces, the decorative element can also be made completely of metal.

Of course, there may also be provided several decorative elements at one steering wheel, and the decorative elements may be disposed both at the steering wheel rim and at the steering wheel spokes.

It is also conceivable to design the latching element of the decorative element for instance as a recess in the decorative element and provide for instance a projection or a latching hook on the shell.

DETAILED DESCRIPTION OF THE PREFERRED EMBODIMENTS

Figure 1:
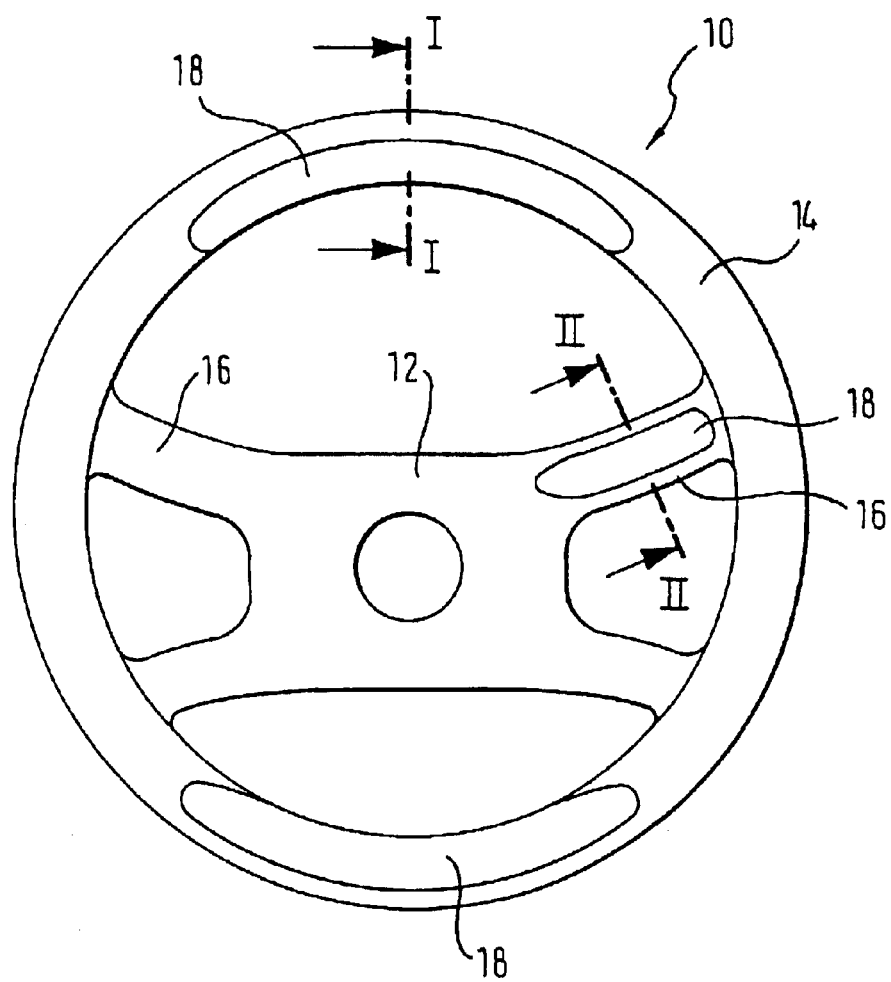
FIG. 1 shows a steering wheel according to the invention.

FIG. 1 shows a steering wheel 10 according to the invention, comprising a hub 12, a steering wheel rim 14 as well as spokes 16 which connect the steering wheel rim 14 with the hub 12. On the steering wheel rim 14 and/or on the spoke 16 decorative elements 18 are arranged. Number and arrangement of the decorative elements 18 are chosen merely by way of example, and the decorative elements can be placed at any point of steering wheel rim and spoke and in any number.

Figure 2:
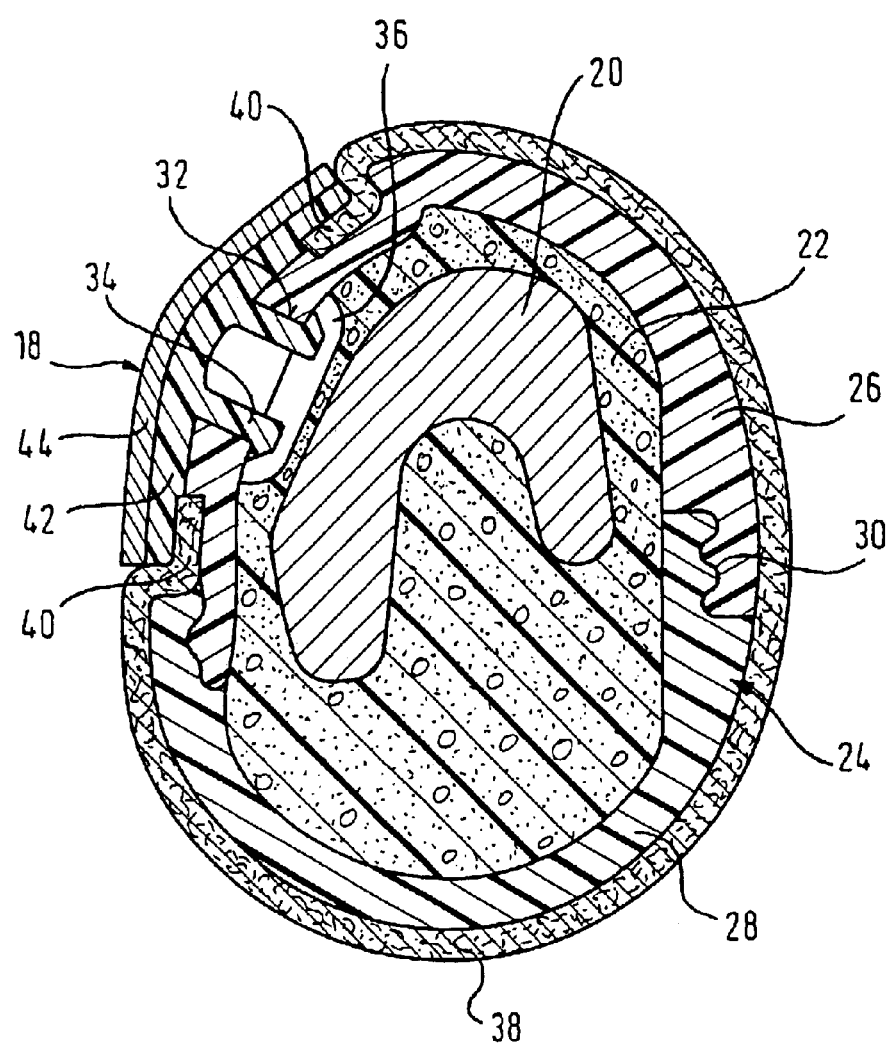
FIG. 2 shows a section along line I—I or line II—II in FIG. 1.

FIG. 2 shows a section through the steering wheel rim along line I—I or through a spoke along line II—II in FIG. 1 and illustrates the construction of the steering wheel. In their interior, the steering wheel rim 14 and the spoke 16 include a skeleton 20, which imparts the steering wheel the fundamental stability. The skeleton 20 is surrounded by a sheathing 22, which can for instance consist of a foamed material such as PUR and be applied onto the skeleton by a known foaming method.

However, the sheathing designated with 22 can also consist of an injection-molded thermoplastic material or of an expandable PE or PP.

The sheathing is surrounded by a shell 24, which in the illustrated example consists of an upper shell 26 and a lower shell 28. Upper shell and lower shell are connected with each other at their edges via a latching connection 30, and they may just as well be bonded or connected with each other by another known technology. The upper shell 26 has an opening 32. For fastening further decorative elements further openings may be provided, which are not shown here. It is also possible to provide several openings for fastening one decorative element. As seen in a section taken through the steering wheel rim or the spoke, the decorative element is, thus, placed onto the shell from radial outside, so that a type of double-layered structure is produced in that region.

The decorative element 18 has a latching element 34, which preferably is integrally connected with the decorative element 18. The latching element 34 comprising two flexible hooks protrudes through the opening 32 and engages behind the upper shell 26. At this point, a recess 36 is provided in the sheathing 22. The latching element 34 may be of any known design.

In this embodiment, the steering wheel rim 14 or the spoke 16 are surrounded by a leather coating 38, which is interrupted below the decorative element 18. The edges 40 of the leather coating have been clamped between the upper shell 26 and the decorative element 18, so that in the region of the decorative element 18 a further fastening of the leather coating 38 can be omitted.

The assembly of the steering wheel according to the invention is effected as follows: First of all, the steering wheel skeleton 20 is provided with the sheathing 22, as described above, and subsequently the lower shell 28 and the upper shell 26 are arranged around the sheathing and connected with each other via the latching connection 30. In the next step, the leather coating 38 is applied and closed at points outside the decorative element 18 in a known manner. Subsequently, the decorative element 18 with its latching element 34 is pushed into the opening 32 and latched with the upper shell 26 by the latching element 34 latching in place at the rear side of the upper shell 26; in so doing, the edges 40 of the leather coating 38 are clamped between the decorative element 18 and the upper shell 26.

The decorative element 18 itself can consist of two portions, namely a plastic carrier 42 at which the latching element 34 is integrally molded, and a surface component 44 with a surface material of high-quality appearance.

What is claimed is:

1. A steering wheel comprising:

a steering wheel rim, a hub and at least one spoke connecting said steering wheel rim and said hub, at least one of said steering wheel rim and said spoke comprising a skeleton, a sheathing surrounding said skeleton, a shell arranged around said sheathing and having an outer side, a coating surrounding said shell, and at least one decorative element, said element being directly supported on said outer side of said shell, and at least one latching element being provided by which said decorative element is directly attached to said shell.

2. The steering wheel according to claim 1, wherein said latching element is integrally molded on said decorative element.

3. The steering wheel according to claim 1, wherein said decorative element consists of a plastic carrier arranged on an inner side and of a surface component.

4. The steering wheel according to claim 3, wherein said latching element is integrally molded on said plastic carrier.

5. A steering wheel comprising:

a steering wheel rim, a hub and at least one spoke connecting said steering wheel rim and said hub, at least one of said steering wheel rim and said spoke comprising a skeleton, a sheathing surrounding said skeleton as well as a shell arranged around said sheathing, and at least one decorative element, at least one latching element being provided by means of which said decorative element is directly attached to said shell, wherein there is provided a leather coating which has edges and surrounds said shell, and wherein said edges of said leather coating are at least partly clamped between said decorative element and said shell.

* * * * *